United States Patent
Lemmer et al.

(10) Patent No.: US 7,150,916 B2
(45) Date of Patent: *Dec. 19, 2006

(54) COATED ARTICLE WITH LOW-E COATING INCLUDING TIN OXIDE INTERLAYER FOR HIGH BEND APPLICATIONS

(75) Inventors: Jean-Marc Lemmer, Lorentzweiler (LU); Scott V. Thomsen, South Lyon, MI (US); Jens-Peter Muller, Differdange (LU); Philip J. Lingle, Temperance, MI (US); Jose Ferreira, Luxembourg (LU)

(73) Assignees: Centre Luxembourg de Recherches pour le Verre et la Ceramique S.A. (C.R.V.C.), Grand Duche de Luxembourg; Guardian Industries Corp., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/914,635

(22) Filed: Aug. 10, 2004

(65) Prior Publication Data

US 2005/0202255 A1    Sep. 15, 2005

Related U.S. Application Data

(63) Continuation-in-part of application No. 10/797,561, filed on Mar. 11, 2004.

(51) Int. Cl.
*B32B 17/06* (2006.01)
(52) U.S. Cl. ............... 428/432; 428/428; 428/433; 428/434; 428/697; 428/698; 428/699; 428/701; 428/702; 428/704
(58) Field of Classification Search ........ 428/428, 428/432, 433, 434, 697, 698, 699, 701, 702, 428/704
See application file for complete search history.

(56) References Cited

U.S. PATENT DOCUMENTS

| | | | |
|---|---|---|---|
| 4,806,220 A | 2/1989 | Finley | |
| 4,898,789 A | 2/1990 | Finley | |
| 5,110,662 A | 5/1992 | Depauw et al. | |
| 5,270,517 A | 12/1993 | Finley | |
| 5,557,462 A | 9/1996 | Hartig et al. | |
| 5,688,585 A | 11/1997 | Lingle et al. | |
| 5,718,980 A | 2/1998 | Koch et al. | |
| 5,821,001 A | 10/1998 | Arbab et al. | |
| 6,045,896 A * | 4/2000 | Boire et al. ............. | 428/216 |
| 6,090,481 A | 7/2000 | Depauw et al. | |
| 6,287,675 B1 | 9/2001 | Guiselin et al. | |
| 6,322,881 B1 | 11/2001 | Boire et al. | |
| 6,445,503 B1 | 9/2002 | Lingle | |

(Continued)

OTHER PUBLICATIONS

U.S. Appl. No. 10/797,561, filed Mar. 11, 2004.

*Primary Examiner*—Jennifer C. McNeil
*Assistant Examiner*—G. Blackwell
(74) *Attorney, Agent, or Firm*—Nixon & Vanderhye P.C.

(57) ABSTRACT

A coated article is provided which may be heat treated (e.g., thermally tempered) and/or heat bent in certain example instances. In certain example embodiments, an interlayer of or including a metal oxide such as tin oxide is provided under an infrared (IR) reflecting layer so as to be located between respective layers of or including silicon nitride and zinc oxide. It has been found that the use of such a tin oxide inclusive interlayer results in significantly improved bendability of the coated article in applications such as vehicle windshields with deep bends. In certain example instances, an overcoat of a material such as zirconium oxide may also be provided.

30 Claims, 2 Drawing Sheets

U.S. PATENT DOCUMENTS

| | | |
|---|---|---|
| 6,524,688 B1 | 2/2003 | Eby et al. |
| 6,572,940 B1 | 6/2003 | Noethe et al. |
| 6,576,349 B1 | 6/2003 | Lingle et al. |
| 6,625,875 B1 | 9/2003 | Sol |
| 6,632,491 B1 * | 10/2003 | Thomsen et al. ............. 428/34 |
| 6,686,050 B1 | 2/2004 | Lingle et al. |
| 2002/0064662 A1 | 5/2002 | Lingle et al. |
| 2003/0150711 A1 | 8/2003 | Laird |
| 2004/0005467 A1 | 1/2004 | Neuman et al. |

\* cited by examiner

COATED ARTICLE WITH LOW-E COATING INCLUDING TIN OXIDE INTERLAYER FOR HIGH BEND APPLICATIONS

This is a continuation-in-part (CIP) of U.S. patent application Ser. No. 10/797,561, filed Mar. 11, 2004, the disclosure of which is hereby incorporated herein by reference.

This invention relates to a coated article, such as a vehicle windshield or the like, including a low-E coating. In certain example embodiments, an interlayer comprising tin oxide or the like may be provided under an infrared (IR) reflecting layer and in particular between respective layers comprising silicon nitride and zinc oxide. In certain example embodiments, the coated article may be heat treated (e.g., thermally tempered, heat bent and/or heat strengthened). Coated articles according to certain example embodiments of this invention may be used in the context of bent vehicle windshields or in any other suitable application.

BACKGROUND OF THE INVENTION

Coated articles are known in the art for use in window applications such as insulating glass (IG) window units, vehicle windows, and/or the like. It is known that in certain instances, it is desirable to heat treat (e.g., thermally temper, heat bend and/or heat strengthen) such coated articles for purposes of tempering, bending, or the like in certain example instances.

In certain situations, designers of coated articles often strive for a combination of high visible transmission, substantially neutral color, low emissivity (or emittance), and low sheet resistance ($R_s$). High visible transmission for example may permit coated articles to be more desirable in certain window applications, whereas low-emissivity (low-E) and low sheet resistance characteristics permit such coated articles to block significant amounts of IR radiation so as to reduce for example undesirable heating of vehicle or building interiors.

In applications such as vehicle windshields requiring a visible transmission of at least 70%, or even at least 75%, the coated article must be bent as well as heat treated. The bending is often performed by allowing a coated glass article to sag while being heat treated in a known manner. The heat treatment of such coated articles typically requires the use of temperature(s) of at least 580 degrees C., more preferably of at least about 600 degrees C. and often at least 620 degrees C., for about 5-10 minutes or more.

Unfortunately, heretofore, too much bending often causes such coated articles to suffer damage known as mottling. Mottling defects essentially result from cracking of the coating. With certain coated articles, mottling occurs when the coated article is heat bent to a significant extent. It is believed that the mottling damage results from high degrees of bending during heat treatment.

FIG. 1 is provided for the purpose of explaining the degree of bending of a coated glass article such as a vehicle windshield. FIG. 1 is a cross sectional view of a bent vehicle windshield. Parameter "x" in FIG. 1 represents the amount of bend in the windshield, and is known as a centerline convex value. The centerline convex value x is the distance between the apex of the interior surface of the windshield drawn straight down to a line (see the dotted line in FIG. 1) connecting the two ends of the windshield. This centerline convex value x is representative of the amount of bend (or depth of bend) in the windshield; the higher the value x, the higher the amount of bend in the windshield. FIG. 2 is a cross sectional view of a heat bent vehicle windshield (e.g., of FIG. 1, or an embodiment herein) which includes first and second heat bent glass substrates laminated to one another via a polymer inclusive layer (e.g., of or including PVB or any other suitable polymer inclusive material) 42, where the low-E (low emissivity) coating is provided on one of the substrates.

While many known windshields are capable of withstanding bends of about 18 mm (i.e., a centerline convex value x of about 18 mm), they cannot withstand bending to a greater extend without suffering from fatal mottling damage.

Consider the following coated article with the below-listed layer stack, where the layers are listed in order from the glass substrate outwardly.

Glass Substrate
$TiO_2$
$Si_3N_4$
ZnO
Ag
$NiCrO_x$
$SnO_2$
$Si_3N_4$
ZnO
Ag
$NiCrO_x$
$SnO_2$
$Si_3N_4$ While the aforesaid coated article is heat treatable, it cannot withstand significant degrees of heat bending without suffering fatal mottling damage. For example, such a coated article suffers fatal mottling damage at centerline convex values x of about 22-23 mm or more (i.e., a bend about 22-23 mm or more deep). In this regard, it is believed that the mottling damage begins at the interface between the silicon nitride and zinc oxide layers under the top silver layer, and then expands through the coating.

It will be appreciated by those skilled in the art that there sometimes exists a need for a vehicle windshield which is bent to a significant extent (e.g., bent to a centerline convex value x of at least about 24 mm, sometimes at least about 26 mm, or at least about 28 mm, or even at least 30 mm in certain situations). Unfortunately, the coated article discussed above cannot be used in such applications because it cannot withstand such high degrees of bending without suffering fatal mottling damage.

Moreover, in vehicle windshield or other applications such as in insulating glass (IG) window units, lengthy heat treatments at high temperatures tend to cause the aforesaid coated article to suffer significant drops in visible transmission, significant changes in certain color value(s), and significant increases in sheet resistance ($R_s$). Thus, there is room for improvement in one or more of these respects. Additionally, the aforesaid coated article is susceptible to scratching in certain instances, and is also sometimes characterized by high haze values following heat treatment in certain instances.

In view of the above, it will be apparent to those skilled in the art that there exists a need for coated articles which are capable of: (a) being bent to greater extents in applications such as vehicle windshields or the like, (b) being able to maintain acceptable optical characteristics when bent to such extents, (c) realizing improved or good thermal stability with regard to visible transmission, color, emissivity (or emittance), and/or sheet resistance ($R_s$); (d) realizing improved mechanical durability such as scratch resistance; and/or (e) realizing improved haze characteristics. In certain example embodiments, it may be desired that one or more of these characteristics can be achieved.

BRIEF SUMMARY OF EXAMPLE EMBODIMENTS OF THE INVENTION

In certain example embodiments of this invention, an interlayer comprising tin oxide is provided under an infrared (IR) reflecting layer so as to be located between respective layers comprising silicon nitride and zinc oxide.

Unexpectedly, it has been found that the use of such a tin oxide inclusive interlayer (or adhesion layer) results in significantly improved bendability of coated articles in applications such as vehicle windshields or the like. In particular, it has surprisingly been found that the provision of such a tin oxide inclusive interlayer (or adhesion layer) permits a coated article to be bent to a significantly greater extent without suffering significant or fatal mottling damage in certain example embodiments of this invention.

In certain example embodiments of this invention, coated articles with such a tin oxide inclusive interlayer can be heat bent to a centerline convex value "x" of at least about 24 mm, more preferably at least about 26 mm, more preferably at least 28 mm, even more preferably at least 30 mm, still more preferably at least about 32 mm, more preferably at least about 34 mm, and sometimes at least about 36 mm, without suffering significant or fatal mottling damage.

In certain example embodiments of this invention, it is possible that the tin oxide inclusive interlayer can improve mechanical durability (e.g., scratch resistance) and/or haze characteristics in applications such as vehicle windshields, IG window units, and/or the like.

These surprisingly results, which in certain example instances are associated with the use of the combination layer stack portion of glass . . . $Si_xN_y$/$SnO_2$/ZnO/Ag . . . , are highly advantageous, since reduction in mottling damage, bendability and/or improved scratch resistance are typically desired features in coated articles such as vehicle windows, IG window units, and/or the like.

In certain example instances, it has been found that the presence of the tin oxide inclusive interlayer in certain situations can result in thermal stability issues in vehicle windshield applications where significant bending and heat treatment are performed (e.g., suitable visible transmission cannot be maintained following heat treatment and bending). However, it has unexpectedly been found that the provision of an overcoat layer of or including zirconium oxide or the like can reduce and/or eliminate such thermal stability problems. In particular, in certain example embodiments of this invention, the use of a zirconium oxide inclusive overcoat layer in combination with the tin oxide inclusive interlayer can result in a coated article which does not suffer from significant thermal stability issues (e.g., realizes acceptable visible transmission, a* and/or b* values following heat treatment and bending).

In certain example embodiments of this invention, there is provided a bent vehicle windshield comprising first and second bent glass substrates, the first bent substrate supporting a coating thereon, the coating comprising: a first dielectric layer supported by the first bent glass substrate; a first infrared (IR) reflecting layer comprising silver supported by the first bent glass substrate and located over at least the first dielectric layer; a first layer comprising silicon nitride located over at least the first IR reflecting layer and the first dielectric layer; a first layer comprising tin oxide located over and contacting the first layer comprising silicon nitride; a first layer comprising zinc oxide located over and contacting the first layer comprising tin oxide, so that the first layer comprising tin oxide is located between and contacting the first layer comprising silicon nitride and the first layer comprising zinc oxide; a second IR reflecting layer comprising silver located over and contacting the first layer comprising zinc oxide; and at least another dielectric layer located over at least the second IR reflecting layer.

In other example embodiments of this invention, there is provided a heated treated and bent coated article including a coating supported by a glass substrate, the coating comprising from the glass substrate outwardly: first and second IR reflecting layers comprising silver; at least one of said IR reflecting layers being provided directly on and contacting a layer comprising zinc oxide, wherein said layer comprising zinc oxide is located directly on and contacting a layer comprising tin oxide; and wherein the coated article is capable of being heat bent so as to have a centerline convex value "x" of at least about 26 mm, more preferably at least about 28 mm, even more preferably at least about 30 mm, without experiencing significant mottling damage due to heat bending.

In still further example embodiments of this invention, there is provided a method of making a window, the method comprising: forming a coating on a glass substrate, the coating comprising first and second layers comprising silver with at least a layer comprising tin oxide therebetween; and heat bending the glass substrate with the coating thereon to an extent so as to have a centerline convex value "x" of at least about 28 mm without experiencing significant mottling damage due to the heat bending.

DETAILED DESCRIPTION OF EXAMPLES OF THE INVENTION

Figure 1:
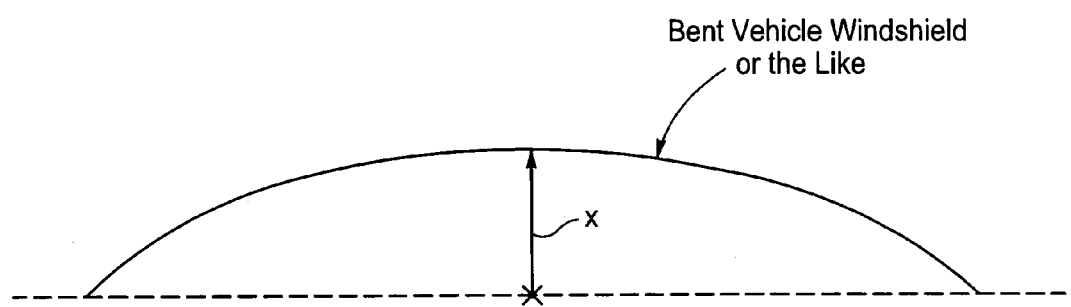
FIG. 1 is a schematic diagram illustrating the centerline convex value ("x") of a bent vehicle windshield or other bent coated article.

Coated articles herein may be used in applications such as bent vehicle windshields, other types of vehicle windows, and/or any other suitable application such as in an IG or monolithic window unit.

In certain example embodiments of this invention, an interlayer comprising tin oxide (e.g., see layer 15 in FIG. 3) is provided under an infrared (IR) reflecting layer (e.g., see layer 19 in FIG. 3) so as to be located between respective layers comprising silicon nitride and zinc oxide. Unexpectedly, it has been found that the use of such a tin oxide inclusive interlayer (or adhesion layer) results in significantly improved bendability of coated articles in applications such as vehicle windshields or the like. In particular, it has surprisingly been found that the provision of such a tin oxide inclusive interlayer (or adhesion layer) permits a coated article to be bent to a significantly greater extent without suffering significant or fatal mottling damage in certain example embodiments of this invention.

In certain example embodiments of this invention, improved mechanical durability and/or reduced damage upon heat treatment can be realized when thermodynamically stable silver based layers are deposited, and the use of the tin oxide 15 is believed to aid in providing such silver based layers even though the tin oxide 15 is not in direct contact with the silver 19 in certain example embodiments of this invention. It is believed that the tin oxide 15 may reduce damage to the zinc oxide 17 which may otherwise be caused by silicon nitride 14 directly contacting the zinc oxide 17 if the tin oxide was not present. In other words, it has unexpectedly been found that by providing a metal oxide (e.g., tin oxide) inclusive layer 15 between the silicon nitride 14 and zinc oxide 17, significantly improved bendability can be achieved. It is believed that the elimination of the silicon nitride/zinc oxide interface under the top IR reflecting layer 19 leads to a more stable and heat treatable/bendable product.

In certain example embodiments of this invention, coated articles with such a tin oxide inclusive interlayer 15 can be heat bent to a centerline convex value "x" of at least about 24 mm (e.g., see FIG. 1), more preferably at least about 26 mm, more preferably at least about 28 mm, even more preferably at least 30 mm, still more preferably at least about 32 mm, more preferably at least about 34 mm, and sometimes at least about 36 mm, without suffering significant or fatal mottling damage. In certain example embodiments of this invention, it is possible that the tin oxide inclusive interlayer can also improve mechanical durability (e.g., scratch resistance) and/or haze characteristics in applications such as vehicle windshields, IG window units, monolithic windows, and/or the like.

These surprisingly results, which in certain example instances are associated with the use of the combination layer stack portion of glass . . . $Si_xN_y/SnO_2/ZnO/Ag$ . . . , are highly advantageous, since reduction in mottling damage, bendability and/or improved scratch resistance are typically desired features in coated articles such as vehicle windows, IG window units, and/or the like.

In certain example instances, it has been found that the presence of the tin oxide inclusive interlayer in certain situations can result in thermal stability problems in vehicle windshield applications where significant bending and heat treatment are performed (e.g., suitable visible transmission cannot be maintained following heat treatment and bending). However, it has unexpectedly been found that the provision of an overcoat layer of or including zirconium oxide (e.g., see layer 27 in FIG. 3) or the like can reduce and/or eliminate such thermal stability problems. In particular, in certain example embodiments of this invention, the use of a zirconium oxide inclusive overcoat layer 27 in combination with the tin oxide inclusive interlayer 15 can result in a coated article which does not suffer from significant thermal stability issues (e.g., the coated article can realize acceptable visible transmission, a* and/or b* values following heat treatment and bending).

Example advantages associated with certain example embodiments of this invention include a coated article which is capable of: (a) being bent to greater extents in applications such as vehicle windshields or the like, (b) being able to maintain acceptable optical characteristics when bent to such extents, (c) realizing improved or good thermal stability with regard to visible transmission, color, emissivity (or emittance), and/or sheet resistance ($R_s$); (d) realizing improved mechanical durability such as scratch resistance; and/or (e) realizing improved haze characteristics. In certain example embodiments, one or more of these characteristics/advantages can be achieved.

In certain example embodiments of this invention, the coating includes a double-silver stack, although this invention is not so limited in all instances. For example, in certain example embodiments of this invention, heat treated and/or heat bent coated articles having multiple IR reflecting layers (e.g., two spaced apart silver based layers) are capable of realizing a sheet resistance ($R_s$) of less than or equal to 3.0 (more preferably less than or equal to 2.5, even more preferably less than or equal to 2.1, and most preferably less than or equal to 2.0). In certain example embodiments, following heat treatment and as measured in monolithic and/or laminated form, coated articles herein are capable of realizing a visible transmission (Ill. C, 2 degree) of at least about 70%, more preferably of at least about 75%, and most preferably of at least about 76%.

The terms "heat treatment" and "heat treating" as used herein mean heating the article to a temperature sufficient to achieve thermal tempering, heat bending, and/or heat strengthening of the glass inclusive coated article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes or more.

Bending may be performed in any suitable manner. For example, and without limitation, in forming a windshield including a pair of glass substrates, two flat glass substrates (at least one with a coating thereon) can be placed in a bending furnace (e.g., on a bending mold) in an overlapping manner by interposing an optional lubricating powder such as sodium hydrogen carbonate, cerite, magnesium oxide, silica, or the like between contacting surfaces of the two glass substrates. The glass substrates are then heated using infrared (IR) emitting heating elements to a processing temperature(s) near a softening point of the glass (e.g., from about 550 to 850 degrees C., more preferably from about 580 to 750 degrees C.) in order to soften the overlapping glass substrates. Upon softening, the glass substrates (including any solar control coating such as a low-E coating thereon) are bent by their deadweight (i.e., sagging) along a shaping surface of a bending mold (not shown) into the desired curved shape appropriate for the vehicle windshield being made. A press bending apparatus may optionally be used after the glass is sufficiently softened (e.g., press bending may be conducted as the final step before cooling the glass). After being heat bent in such a manner, the bent glass substrates (with solar control coating still on the bent substrate) are separated from one another and a polymer inclusive interlayer sheet (e.g., PVB) is interposed therebetween. The bent glass substrates are then laminated to one another via the polymer inclusive interlayer (e.g., PVB) in order to form the resulting vehicle windshield.

Figure 3:
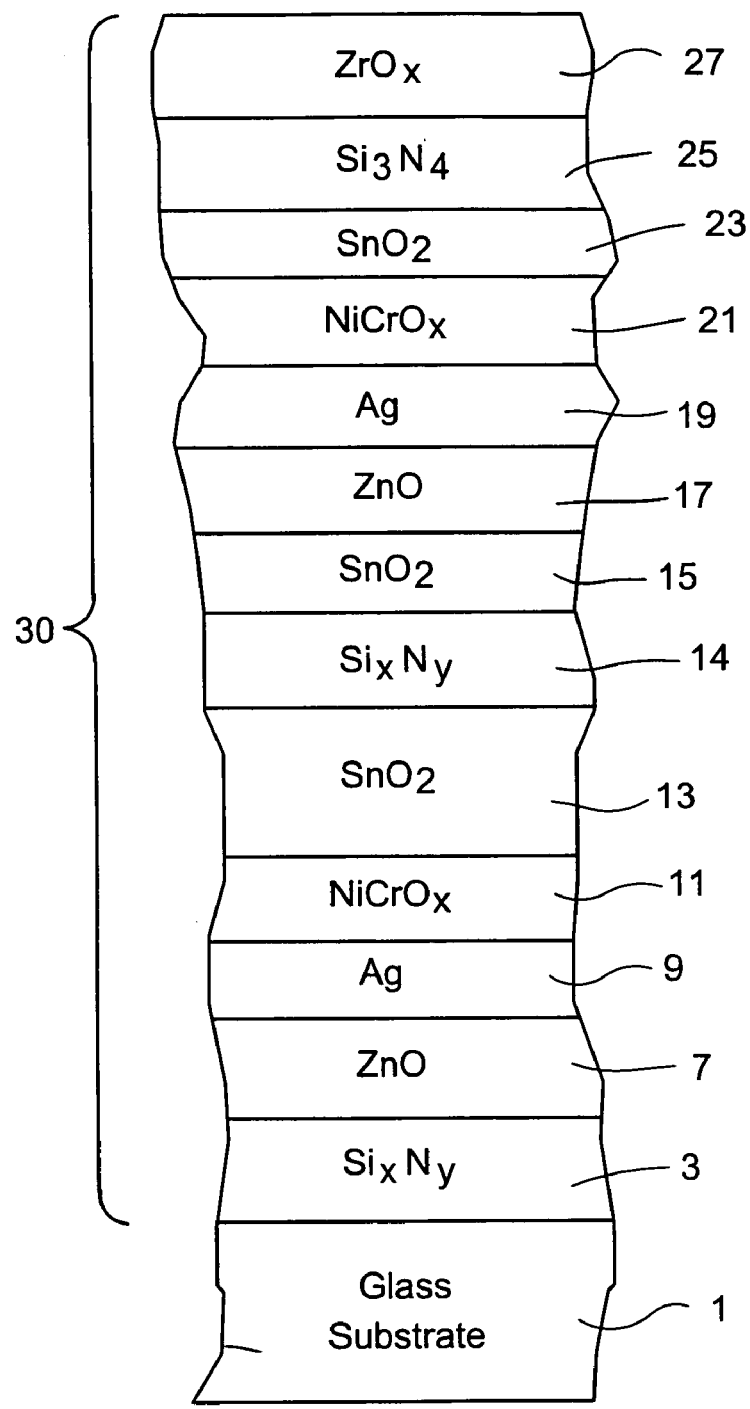
FIG. 3 is a cross sectional view of a coated article according to an example embodiment of this invention.

FIG. 3 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and coating (or layer system) 30 provided on the substrate 1 either directly or indirectly. The coating (or layer system) 30 includes: bottom silicon nitride inclusive dielectric layer 3 which may be $Si_3N_4$, of the Si-rich type for haze reduction, or of any other suitable stoichiometry in different embodiments of this invention, first lower contact layer 7 (which contacts IR reflecting layer 9), first conductive and preferably metallic infrared (IR) reflecting layer 9, first upper contact layer 11 (which contacts layer 9), dielectric layer 13 (which may be deposited in one or multiple steps in different embodiments of this invention) of or including tin oxide, another silicon nitride inclusive layer 14, tin oxide inclusive interlayer (or adhesion layer) 15, second lower contact layer 17 (which contacts IR reflecting layer 19), second conductive and preferably metallic IR reflecting layer 19, second upper contact layer 21 (which contacts layer 19), dielectric layer 23, and silicon nitride inclusive layer 25, and finally optional protective dielectric layer 27 of or including zirconium oxide. The "contact" layers 7, 11, 17 and 21 each contact at least one IR reflecting layer (e.g., layer based on Ag). The aforesaid layers 2–27 make up low-E (i.e., low emissivity) coating 30 which is provided on glass or plastic substrate 1.

Figure 2:
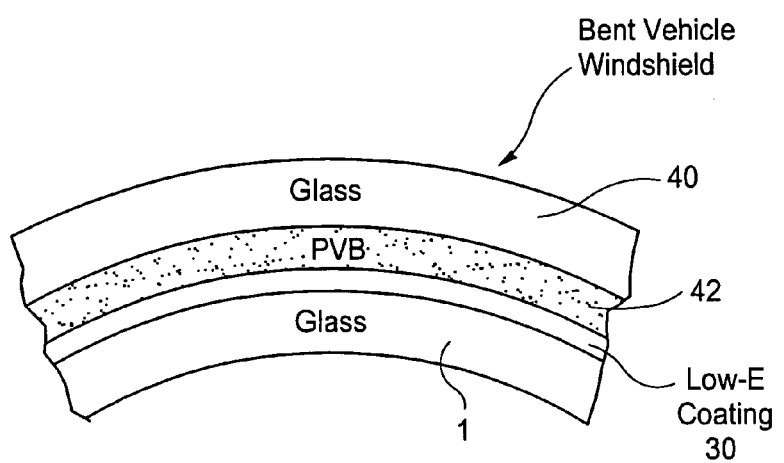
FIG. 2 is a cross sectional view of a bent vehicle windshield, of FIG. 1, or of a suitable embodiment of this invention.

In monolithic instances, the coated article includes only one glass substrate 1 as illustrated in FIG. 1. However, monolithic coated articles herein may be used in devices such as laminated vehicle windshields, IG window units, and the like. As shown in FIG. 2, a laminated vehicle window such as a windshield typically includes first and second glass substrates 1 and 40 laminated to one another via a polymer based interlayer 42 (e.g., see U.S. Pat. No. 6,686,050, the disclosure of which is incorporated herein by reference). One of these substrates of the laminate may support coating 30 on an interior surface thereof in certain example embodiments (either substrate may support the low-E coating 30, although the inner substrate supports the coating in the example shown in FIG. 2). As for IG window units, an IG window unit may include two spaced apart substrates. An example IG window unit is illustrated and described, for example, in U.S. Pat. No. 6,632,491, the disclosure of which is hereby incorporated herein by reference. An example IG window unit may include, for example, the coated glass substrate 1 shown in FIG. 3 coupled to another glass substrate via spacer(s), sealant(s) or the like with a gap being defined therebetween. This gap between the substrates in IG unit embodiments may in certain instances be filled with a gas such as argon (Ar).

Dielectric layers 3 and 14 may be of or include silicon nitride in certain embodiments of this invention. Silicon nitride layers 3 and 14 may, among other things, improve heat-treatability of the coated articles, e.g., such as thermal tempering or the like. The silicon nitride of layers 3 and/or 14 may be of the stoichiometric type (i.e., $Si_3N_4$), or alternatively of the Si-rich type in different embodiments of this invention. For example, Si-rich silicon nitride 3 (and/or 14) combined with zinc oxide and/or tin oxide under a silver based IR reflecting layer may permit the silver to be deposited (e.g., via sputtering or the like) in a manner which causes its sheet resistance to be lessened compared to if certain other material(s) were under the silver. Moreover, the presence of free Si in a Si-rich silicon nitride inclusive layer 3 may allow certain atoms such as sodium (Na) which migrate outwardly from the glass 1 during heat treatment (HT) to be more efficiently stopped by the Si-rich silicon nitride inclusive layer before they can reach the silver and damage the same. Thus, it is believed that the oxidation caused by heat treatment allows visible transmission to increase, and that the Si-rich $Si_xN_y$ in layer 3 for example can reduce the amount of damage done to the silver layer(s) during HT in certain example embodiments of this invention thereby allowing sheet resistance ($R_s$) to decrease or remain about the same in a satisfactory manner.

In certain example embodiments, when Si-rich silicon nitride us used in layer 3 and/or 14, the Si-rich silicon nitride layer as deposited may be characterized by $Si_xN_y$ layer(s), where x/y may be from 0.76 to 1.5, more preferably from 0.8 to 1.4, still more preferably from 0.85 to 1.2. Moreover, in certain example embodiments, before and/or after HT the Si-rich $Si_xN_y$ layer(s) may have an index of refraction "n" of at least 2.05, more preferably of at least 2.07, and sometimes at least 2.10 (e.g., 632 nm) (note: stoichiometric $Si_3N_4$ which may also be used has an index "n" of 2.02–2.04). In certain example embodiments, it has surprisingly been found that improved thermal stability is especially realizable when the Si-rich $Si_xN_y$ layer(s) as deposited has an index of refraction "n" of at least 2.10, more preferably of at least 2.20, and most preferably from 2.2 to 2.4. Also, the Si-rich $Si_xN_y$ layer in certain example embodiments may have an extinction coefficient "k" of at least 0.001, more preferably of at least 0.003 (note: stoichiometric $Si_3N_4$ has an extinction coefficient "k" of effectively 0). Again, in certain example embodiments, it has surprisingly been found that improved thermal stability can be realized when "k" for the Si-rich $Si_xN_y$ layer(s) is from 0.001 to 0.05 as deposited (550 nm). It is noted that n and k tend to drop due to heat treatment.

Any and/or all of the silicon nitride layers discussed herein may be doped with other materials such as stainless steel or aluminum in certain example embodiments of this invention. For example, any and/or all silicon nitride layers discussed herein may optionally include from about 0–15% aluminum, more preferably from about 1 to 10% aluminum, in certain example embodiments of this invention. The silicon nitride may be deposited by sputtering a target of Si or SiAl in an atmosphere including at least nitrogen gas in certain embodiments of this invention.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers may, however, be slightly oxidized in certain embodiments of this invention.

The upper contact layers 11 and 21 may be of or include nickel (Ni) oxide, chromium/chrome (Cr) oxide, or a nickel alloy oxide such as nickel chrome oxide ($NiCrO_x$), or other suitable material(s), in certain example embodiments of this invention. The use of, for example, $NiCrO_x$ in these layers (11 and/or 21) allows durability to be improved. The $NiCrO_x$ of layers 11 and/or 21 may be fully oxidized in certain embodiments of this invention (i.e., fully stoichiometric), or alternatively may only be partially oxidized (i.e., sub-oxide). In certain instances, the $NiCrO_x$ layers 11 and/or 21 may be at least about 50% oxidized. Contact layers 11 and/or 21 (e.g., of or including an oxide of Ni and/or Cr) may or may not be oxidation graded in different embodiments of this invention. Oxidation grading means that the degree of oxidation in the layer changes throughout the thickness of the layer. For example, a contact layer 11 and/or 21 may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layers 11 and/or 21 (e.g., of or including an oxide of Ni and/or Cr) may or may not be continuous in different embodiments of this invention across the entire underlying IR reflecting layer.

Dielectric layer 13 may be of or include tin oxide in certain example embodiments of this invention. However, as with other layers herein, other materials may be used in different instances.

Lower contact layers 7 and/or 17 in certain embodiments of this invention are of or include zinc oxide (e.g., ZnO). The zinc oxide of layers 7 and 17 may contain other materials as well such as Al (e.g., to form $ZnAlO_x$). For example, in certain example embodiments of this invention, one or more of zinc oxide layers 7, 17 may be doped with from about 1 to 10% Al, more preferably from about 1 to 5% Al, and most preferably about 1 to 4% Al.

Interlayer 15 of or including tin oxide is provided under IR reflecting layer 19 so as to be located between silicon nitride layer 14 and zinc oxide layer 17. Surprisingly, as explained above, it has been found that the use of such a tin oxide inclusive interlayer 15 results in significantly improved bendability of coated articles in applications such as vehicle windshields or the like. In particular, it has surprisingly been found that the provision of such a tin oxide inclusive interlayer 15 permits a coated article to be bent to a significantly greater extent without suffering significant or fatal mottling damage in certain example embodiments of this invention. The presence of this layer also surprisingly improves scratch resistance in certain example instances. In certain alternative embodiments, it is possible to dope the tin oxide of layer 15 with other materials such as Al, Zn, N, or the like. Alternatively, other metal oxide(s) may be used for layer 15 in certain instances.

Dielectric layer 23 may be of or include tin oxide in certain example embodiments of this invention. However, layer 23 is optional and need not be provided in certain example embodiments. Dielectric layer 25 may be of or include silicon nitride (e.g., $Si_3N_4$) or any other suitable material in certain example embodiments of this invention. Optionally, other layers may be provided above layer 25. Layer 25 is provided for durability purposes, and to protect the underlying layers during heat treatment and/or environmental use. In certain example embodiments, layer 25 may have an index of refraction (n) of from about 1.9 to 2.2, more preferably from about 1.95 to 2.05.

In highly bent windshield applications, it has been found that the presence of the tin oxide inclusive interlayer 15 in certain situations can result in thermal stability problems when significant bending and heat treatment are performed (e.g., suitable visible transmission cannot be maintained following heat treatment and bending). However, it has unexpectedly been found that the provision of an overcoat layer 27 of or including zirconium oxide can reduce and/or eliminate such thermal stability issues. In particular, in certain example embodiments of this invention, the use of a zirconium oxide inclusive overcoat layer 27 in combination with the tin oxide inclusive interlayer 15 can result in a coated article which can be significantly heat bent without suffering from fatal mottling damage and which does not suffer from significant thermal stability issues (e.g., the coated article can realize acceptable visible transmission, a* and/or b* values following heat treatment and bending).

For purposes of example, first and second coated articles were made so as to have essentially the same layer stack as shown in FIG. 3, except that the second stack did not include a zirconium oxide overcoat layer 27. After heat treatment in a box furnace at 695 degrees C. and bending, the coated article with the zirconium oxide overcoat layer 27 had significantly higher visible transmission than did the coated article without the zirconium oxide overcoat layer heat treated in the same manner (over 2% higher). This illustrates that, unexpectedly, the provision of the metal oxide overcoat layer (e.g., zirconium oxide layer 27) significantly increase the visible transmission of the coated article following HT. In certain example embodiments, the index "n" of the zirconium oxide layer 27 is from about 2.1 to 2.25, more preferably about 2.16 (at 550 nm).

It has also been found that thinning the top silicon nitride layer 25 is also surprisingly advantageous (e.g., to a thickness of no greater than about 100 Å). In particular, the combination of adding the tin oxide inclusive layer 15 and thinning the top silicon nitride layer 25 to a thickness no greater than about 100 Å had the effect of eliminating or significantly reducing the aforesaid mottling problem in high bend applications. Thus, it is believed that thinning of the silicon nitride layer 25 also contributes to eliminating or reducing the mottling problem. However, the thinning of the top silicon nitride inclusive layer 25 and the insertion of the tin oxide layer 15 to reduce mottling may tend to create some thermal stability problems. In this respect, the metal oxide (e.g., zirconium oxide) overcoat layer 27 has been added to improve thermal stability as discussed above.

In certain example embodiments, it has been found that good optical properties are achieved when the total thickness of the combination of tin oxide inclusive layers 13 and 15 is from about 500 to 800 Å, more preferably from about 600 to 700 Å. This total thickness of the combination of layers 13 and 15 may be divided up in any suitable manner in certain example embodiments of this invention. Moreover, the total thickness of layers 3 and 7 may be from about 200 to 400 Å in certain example embodiments of this invention, more preferably from about 220 to 350 Å; and the total thickness of layers 23, 25 and 27 may be from about 300 to 500 Å in certain example embodiments.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 3 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses and materials may be used in layers in different embodiments of this invention, example thicknesses and materials for the respective layers on the glass substrate 1 in the FIG. 3 embodiment are as follows, from the glass substrate outwardly:

Example Materials/Thicknesses; FIG. 3 Embodiment

| Layer<br>Glass (1–10 mm thick) | Preferred<br>Range (Å) | More Preferred<br>(Å) | Example (Å) |
|---|---|---|---|
| $Si_xN_y$ (layer 3) | 40–450 Å | 70–300 Å | 186 Å |
| $ZnO_x$ (layer 7) | 10–300 Å | 40–150 Å | 107 Å |
| Ag (layer 9) | 50–250 Å | 80–120 Å | 107 Å |
| $NiCrO_x$ (layer 11) | 10–100 Å | 12–40 Å | 30 Å |
| $SnO_2$ (layer 13) | 0–1,000 Å | 200–700 Å | 412 Å |
| $Si_xN_y$ (layer 14) | 50–450 Å | 80–200 Å | 131 Å |
| $SnO_2$ (layer 15) | 30–250 Å | 50–200 Å | 108 Å |
| $ZnO_x$ (layer 17) | 10–300 Å | 40–150 Å | 119 Å |
| Ag (layer 19) | 50–250 Å | 80–220 Å | 103 Å |
| $NiCrO_x$ (layer 21) | 10–100 Å | 20–45 Å | 33 Å |
| $SnO_2$ (layer 23) | 0–750 Å | 40–400 Å | 337 Å |
| $Si_3N_4$ (layer 25) | 10–750 Å | 20–100 Å | 53 Å |
| $ZrO_x$ (layer 27) | 0–200 Å | 10–50 Å | 22 Å |

In certain example embodiments of this invention, coated articles herein may have the following optical and solar characteristics set forth in Table 2 when measured monolithically (before any optional HT). The sheet resistances ($R_s$) herein take into account all IR reflecting layers (e.g., silver layers 9, 19).

| Optical/Solar Characteristics (Monolithic; pre-HT) | | | |
|---|---|---|---|
| Characteristic | General | More Preferred | Most Preferred |
| $R_s$ (ohms/sq.): | <=5.0 | <=4.0 | <=3.0 |
| $E_n$: | <=0.07 | <=0.04 | <=0.03 |
| $T_{vis}$ (Ill. C 2°): | >=70% | >=75% | >=77% |

In certain example embodiments, coated articles herein may have the following characteristics, measured monolithically for example, after heat treatment (HT):

| Optical/Solar Characteristics (Monolithic; post-HT) | | | |
|---|---|---|---|
| Characteristic | General | More Preferred | Most Preferred |
| $R_s$ (ohms/sq.): | <=3.0 | <=2.5 | <=2.1 (or <=2.0) |
| $E_n$: | <=0.07 | <=0.04 | <=0.03 |
| $T_{vis}$ (Ill. C 2°): | >=75% | >=78% | >=80% |
| Transmitted Haze: | <=0.5 | <=0.4 | <=0.38 |

Moreover, in certain example laminated embodiments of this invention, coated articles herein which have been heat treated to an extend sufficient for tempering (and optionally heat bent), and which have been laminated (via index oil and/or a polymer inclusive interlayer) to another glass substrate may have the following optical/solar characteristics.

| Example Optical Characteristics (Laminated: post-HT) | | |
|---|---|---|
| Characteristic | General | More Preferred |
| $T_{vis}$ (or TY)(Ill. C 2°): | >=70% | >=75% |
| $a^*_t$ (Ill. C 2°): | -6 to +1.0 | -5 to 0.0 |
| $b^*_t$ (Ill. C 2°): | -2.0 to +8.0 | 0.0 to 6.0 |
| $L^*$ (Ill. C 2°): | 80–95 | 88–95 |
| $R_fY$ (Ill. C, 2 deg.): | 1 to 13% | 1 to 12% |
| $a^*_f$ (Ill. C, 2°): | -5.0 to +2.0 | -4.0 to +0.5 |
| $b^*_f$ (Ill. C, 2°): | -14.0 to +10.0 | -10.0 to +3.5 |
| $L^*$ (Ill. C 2°): | 30–45 | 33–41 |
| $R_gY$ (Ill. C, 2 deg.): | 1 to 12% | 1 to 10% |
| $a^*_g$ (Ill. C, 2°): | -5.0 to +3.0 | -2.5 to +2.5 |
| $b^*_g$ (Ill. C, 2°): | -20.0 to +10.0 | -15.0 to 0 |
| $L^*$ (Ill. C 2°): | 30–40 | 33–38 |
| Haze (transmissive): | <=0.6 | <=0.5 |

The following examples are provided for purposes of example only, and are not intended to be limiting unless specifically claimed.

EXAMPLES

The following Examples were made via sputtering on a 2.1 mm thick clear glass substrate 1 so as to have approximately the layer stack set forth below. Example 1 is according to an example embodiment of this invention as shown in FIG. 3. The thicknesses are in units of angstroms (Å) and are approximations.

| Layer Glass Substrate | Example 1 |
|---|---|
| $Si_xN_y$ | 186 |
| ZnO | 107 |
| Ag | 107 |
| $NiCrO_x$ | 30 |
| $SnO_2$ | 412 |
| $Si_xN_y$ | 131 |
| $SnO_2$ | 108 |
| ZnO | 119 |
| Ag | 103 |
| $NiCrO_x$ | 33 |
| $SnO_2$ | 337 |
| $Si_3N_4$ | 53 |
| ZrO | 22 |

After being sputter deposited onto the glass substrates, the Example coated articles were heat treated in a manner sufficient for tempering. After being formed, the coated article of Example 1 was heat treated in an 8-zone belt furnace for 24 minutes. The eight zones of the belt furnace were at the following temperatures in the following order: 480, 520, 550, 600, 630, 660, 670 and 675 degrees C. (the coated articles was in each zone for about three minutes during the HT). The coated article had the following characteristics, measured monolithically before and after HT.

Example 1

Monolithic, Before/After HT

| Characteristic | pre-HT | Post-HT |
|---|---|---|
| $T_{vis}$ (or TY)(Ill. C 2°): | 77.64% | 81.32% |
| $a^*_t$ (Ill. C 2°): | -5.05 | -3.83 |
| $b^*_t$ (Ill. C 2°): | 5.36 | 1.03 |
| $R_fY$ (Ill. C, 2 deg.): | 6.03% | 6.86% |
| $a^*_f$ (Ill. C, 2°): | 10.93 | 6.12 |
| $b^*_f$ (Ill. C, 2°): | 0.77 | 6.37 |
| $L^*$ (Ill. C 2°): | 29.49 | 31.48 |
| $R_gY$ (Ill. C, 2 deg.): | 7.23% | 7.69% |
| $a^*_g$ (Ill. C, 2°): | 16.28 | 12.66 |
| $b^*_g$ (Ill. C, 2°): | -8.09 | -1.29 |
| $L^*$ (Ill. C 2°): | 32.33 | 33.33 |
| $R_s$ (ohms/square): | 2.7 | 2.0 |
| Haze: | n/a | 0.31 |

Then, following lamination to another 2.1 mm clear glass substrate with index oil, the coated article of Example 1 had the following characteristics:

Example 1

Laminated, Post-HT

| Characteristic | Example 1 |
|---|---|
| $T_{vis}$ (or TY)(Ill. C 2°): | 78.6% |
| $a^*_t$ (Ill. C 2°): | -3.17 |
| $b^*_t$ (Ill. C 2°): | 4.25 |
| $R_fY$ (Ill. C, 2 deg.): | 9.09% |
| $a^*_f$ (Ill. C, 2°): | -1.10 |
| $b^*_f$ (Ill. C, 2°): | -9.38 |
| $L^*$ (Ill. C 2°): | 36.15 |

-continued

| Characteristic | Example 1 |
|---|---|
| $R_gY$ (Ill. C, 2 deg.): | 9.25% |
| $a*_g$ (Ill. C, 2°): | 1.52 |
| $b*_g$ (Ill. C, 2°): | −11.42 |
| $L*$ (Ill. C 2°): | 36.47 |
| $R_s$ (ohms/square): | 2.0 |
| Haze (average): | n/a |

Moreover, heat bending of coated articles with the structure of Example 1 to a centerline convex value "x" of 30 mm did not result in any significant mottling damage. For purposes of comparison, a similar coated article except without a tin oxide layer 15 suffered fatal mottling damage once the bending reached a centerline convex value "x" of about 22–23 mm. Thus, is can be seen that the provision of the tin oxide layer 15 unexpectedly and significantly improves the bendability of the coated article.

Example 2 had the same layer stack as Example 1, except that it was heat treated and heat bent at a windshield manufacturing facility. The data below for Example 2 is broken down into two parts, the first "after bent" data being post-HT in monolithic form following being heat bent during heat treatment to achieve a centerline convex value "x" of about 30 mm (but before lamination), and the "laminated" data being post-HT (and post-bending) after being laminated to another bent glass substrate 40 with a PVB layer 42 to form a windshield. The data below is based on the average of data taken from two points, one in the center of the windshield and the other at the edge (Ill. C, 2 degree). Example 2 (post-HT—Bent to x=30 mm)

| Characteristic | After Bent | Laminated |
|---|---|---|
| $T_{vis}$ (or TY)(Ill. C 2°): | 79.95% | 77.02% |
| $a*_t$ (Ill. C 2°): | −4.19 | −4.77 |
| $b*_t$ (Ill. C 2°): | 0.36 | 3.95 |
| $R_{outside}Y$ (Ill. C, 2 deg.): | 6.8% | 8.57% |
| $a*$ (Ill. C, 2°): | 7.59 | 2.76 |
| $b*$ (Ill. C, 2°): | 1.9 | −8.5 |
| $R_{inside}Y$ (Ill. C, 2 deg.): | 7.95% | 9.04% |
| $a*$ (Ill. C, 2°): | 12.64 | 4.45 |
| $b*$ (Ill. C, 2°): | −1.5 | −10.26 |

Moreover, heat bending of the Example 2 coated article to a centerline convex value "x" of 30 mm did not result in any significant mottling damage. Again, for purposes of comparison, a similar coated article except without a tin oxide layer 15 suffered fatal mottling damage once the bending reached a centerline convex value "x" of about 22–23 mm. Thus, is can be seen that the provision of the tin oxide layer 15 unexpectedly and significantly improves the bendability of the coated article. The coated article of Example 2, in laminated, bent and thus heat treated form, showed excellent heat stability, color uniformity, no mottling damage, excellent cosmetics and optics in a finished windshield product with a centerline convex value "x" of 30 mm.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A bent vehicle windshield comprising first and second bent glass substrates, the first bent substrate supporting a coating thereon, the coating comprising:
   a first dielectric layer supported by the first bent glass substrate;
   a first infrared (IR) reflecting layer comprising silver supported by the first bent glass substrate and located over at least the first dielectric layer;
   a first layer comprising silicon nitride located over at least the first IR reflecting layer and the first dielectric layer;
   a first layer comprising tin oxide located over and contacting the first layer comprising silicon nitride;
   a first layer comprising zinc oxide located over and contacting the first layer comprising tin oxide, so that the first layer comprising tin oxide is located between and contacting the first layer comprising silicon nitride and the first layer comprising zinc oxide;
   a second IR reflecting layer comprising silver located over and contacting the first layer comprising zinc oxide;
   at least another dielectric layer located over at least the second IR reflecting layer; and
   wherein the windshield is bent to a degree sufficient so as to have a centerline convex value "x" of at least about 26 mm.

2. The windshield of claim 1, further comprising a second layer comprising zinc oxide that is located under and contacting the first IR reflecting layer, and wherein at least one of the first and second layers comprising zinc oxide further comprises aluminum.

3. A bent vehicle windshield comprising first and second bent glass substrates, the first bent substrate supporting a coating thereon, the coating comprising:
   a first dielectric layer supported by the first bent glass substrate;
   a first infrared (IR) reflecting layer comprising silver supported by the first bent glass substrate and located over at least the first dielectric layer;
   a first layer comprising silicon nitride located over at least the first IR reflecting layer and the first dielectric layer;
   a first layer comprising tin oxide located over and contacting the first layer comprising silicon nitride;
   a first layer comprising zinc oxide located over and contacting the first layer comprising tin oxide, so that the first layer comprising tin oxide is located between and contacting the first layer comprising silicon nitride and the first layer comprising zinc oxide;
   a second IR reflecting layer comprising silver located over and contacting the first layer comprising zinc oxide;
   at least another dielectric layer located over at least the second IR reflecting layer; and
   an overcoat layer of zirconium oxide.

4. A bent vehicle windshield comprising first and second bent glass substrates, the first bent substrate supporting a coating thereon, the coating comprising:
   a first dielectric layer supported by the first bent glass substrate;
   a first infrared (IR) reflecting layer comprising silver supported by the first bent glass substrate and located over at least the first dielectric layer;
   a first layer comprising silicon nitride located over at least the first IR reflecting layer and the first dielectric layer;
   a first layer comprising tin oxide located over and contacting the first layer comprising silicon nitride;
   a first layer comprising zinc oxide located over and contacting the first layer comprising tin oxide, so that the first layer comprising tin oxide is located between and contacting the first layer comprising silicon nitride and the first layer comprising zinc oxide;

a second IR reflecting layer comprising silver located over and contacting the first layer comprising zinc oxide;

at least another dielectric layer located over at least the second IR reflecting layer; and a second layer comprising tin oxide located under and contacting the first layer comprising silicon nitride.

5. The windshield of claim 1, wherein the first dielectric layer comprises silicon nitride, and wherein the windshield is substantially free of mottling.

6. The windshield of claim 1, wherein the first dielectric layer comprises silicon nitride, and said another dielectric layer also comprises silicon nitride.

7. The windshield of claim 1, wherein the first layer comprising silicon nitride is Si-rich so as to be represented by $Si_xN_y$, where x/y is from 0.8 to 1.4.

8. The windshield of claim 1, wherein the windshield following heat treatment has a visible transmission of at least 75% and a sheet resistance ($R_s$) of less than or equal to 3.0 ohms/square.

9. The windshield of claim 1, wherein the windshield is bent to a degree sufficient so as to have a centerline convex value "x" of at least about 28 mm.

10. The windshield of claim 1, wherein the windshield is bent to a degree sufficient so as to have a centerline convex value "x" of at least about 30 mm.

11. The windshield of claim 4, wherein the windshield is bent to a degree sufficient so as to have a centerline convex value "x" of at least about 26 mm.

12. The windshield of claim 3, wherein the coated article is heat treated and is bent to a degree sufficient so as to have a centerline convex value "x" of at least about 26 mm.

13. A coated article comprising a coating supported by a bent glass substrate, the coating comprising from the bent glass substrate outwardly:

a layer comprising silicon nitride;

a layer comprising tin oxide located over and contacting the layer comprising silicon nitride;

a layer comprising zinc oxide located over and contacting the layer comprising tin oxide, so that the layer comprising tin oxide is located between and contacting the layer comprising silicon nitride and the layer comprising zinc oxide;

an infrared (IR) reflecting layer located over and contacting the layer comprising zinc oxide;

at least another dielectric layer located over at least the IR reflecting; and wherein the coated article is heat treated and is bent to a degree sufficient so as to have a centerline convex value "x" of at least about 26 mm.

14. The coated article of claim 13, further comprising another IR reflecting layer and another layer comprising zinc oxide, wherein the another IR reflecting layer is located directly on and contacting the another layer comprising zinc oxide, wherein the another IR reflecting layer and the another layer comprising zinc oxide are located below the IR reflecting layer recited in claim 12.

15. The coated article of claim 13, wherein the coated article is heat treated and is bent to a degree sufficient so as to have a centerline convex value "x" of at least about 28 mm.

16. The coated article of claim 13, wherein the coated article is heat treated and is bent to a degree sufficient so as to have a centerline convex value "x" of at least about 30 mm.

17. The coated article of claim 13, wherein the coated article is heat treated and is bent to a degree sufficient so as to have a centerline convex value "x" of at least about 32 mm.

18. The coated article of claim 13, further comprising another layer comprising tin oxide located under and contacting the layer comprising silicon nitride.

19. The coated article of claim 13, wherein said at least another dielectric layer comprises at least one of silicon nitride and tin oxide.

20. The coated article of claim 13, wherein the layer comprising silicon nitride is Si-rich so as to be represented by $Si_xN_y$, where x/y is from 0.8 to 1.4.

21. The coated article of claim 13, wherein the coated article comprises a vehicle windshield which has a visible transmission of at least about 75% and a sheet resistance ($R_s$) of less than or equal to 3.0 ohms/square.

22. A heated treated and bent coated article including a coating supported by a glass substrate, the coating comprising from the glass substrate outwardly:

at least a first IR reflecting layer comprising silver;

said first IR reflecting layer being provided directly on and contacting a layer comprising zinc oxide, wherein said layer comprising zinc oxide is located directly on and contacting a layer comprising tin oxide; and wherein the coated article is heat treated and is bent to a degree sufficient so as to have a centerline convex value "x" of at least about 26 mm.

23. The coated article of claim 22, wherein the coated article is bent so as to have a centerline convex value "x" of at least about 28 mm without experiencing significant mottling damage due to heat bending.

24. The coated article of claim 22, wherein the coated article is capable of being heat bent so as to have a centerline convex value "x" of at least about 30 mm without experiencing significant mottling damage due to heat bending.

25. The coated article of claim 22, wherein the coated article has a visible transmission of at least about 75% and a sheet resistance ($R_s$) of less than or equal to 3.0 ohms/square.

26. A bent vehicle windshield comprising:

a coating supported by a bent glass substrate, wherein the coating comprises first and second IR reflecting layers comprising silver which are spaced apart from one another by at least one layer comprising tin oxide, and wherein the windshield is bent to a degree sufficient so as to have a centerline convex value "x" of at least about 26 mm.

27. The coated article of claim 26, wherein the coated article is capable of being heat bent so as to have a centerline convex value "x" of at least about 28 mm without experiencing significant mottling damage due to heat bending.

28. The coated article of claim 26, wherein the coated article is capable of being heat bent so as to have a centerline convex value "x" of at least about 30 mm without experiencing significant mottling damage due to heat bending.

29. The coated article of claim 26, wherein the coated article has a visible transmission of at least about 75% and a sheet resistance ($R_s$) of less than or equal to 3.0 ohms/square.

30. The coated article of claim 22, further comprising a second IR reflecting layer comprising silver that is located between at least the glass substrate and the first IR reflecting layer.

* * * * *